(12) United States Patent
Bielig et al.

(10) Patent No.: US 8,385,213 B2
(45) Date of Patent: Feb. 26, 2013

(54) ERROR IDENTIFICATION IN A COMPUTER-BASED NETWORK

(75) Inventors: Robert Bielig, Burgthann (DE); Thomas Hertlein, Erlangen (DE); Roland Knörl, Dormitz (DE); Frank Strobel, Weilersbach (DE)

(73) Assignee: Siemens Aktiengesellschaft, München (DE)

(*) Notice: Subject to any disclaimer, the term of this patent is extended or adjusted under 35 U.S.C. 154(b) by 121 days.

(21) Appl. No.: 12/267,289

(22) Filed: Nov. 7, 2008

(65) Prior Publication Data

US 2009/0161559 A1 Jun. 25, 2009

(30) Foreign Application Priority Data

Nov. 15, 2007 (DE) .......................... 10 2007 054 648

(51) Int. Cl.
*G06F 11/30* (2006.01)
(52) U.S. Cl. ........................ 370/242; 370/250
(58) Field of Classification Search .................. None
See application file for complete search history.

(56) References Cited

U.S. PATENT DOCUMENTS

| 5,732,213 | A | | 3/1998 | Gessel et al. | |
|---|---|---|---|---|---|
| 5,937,165 | A | * | 8/1999 | Schwaller et al. | 709/224 |
| 6,996,067 | B1 | | 2/2006 | Burke et al. | |
| 2005/0149787 | A1 | * | 7/2005 | Choi et al. | 714/724 |
| 2006/0085723 | A1 | * | 4/2006 | Bartz et al. | 714/776 |
| 2006/0109979 | A1 | * | 5/2006 | Afzal et al. | 379/399.01 |
| 2006/0250967 | A1 | * | 11/2006 | Miller et al. | 370/241 |
| 2007/0174705 | A1 | * | 7/2007 | Shih | 714/36 |
| 2007/0291794 | A1 | * | 12/2007 | Jiang et al. | 370/493 |
| 2008/0287749 | A1 | * | 11/2008 | Reuter | 600/300 |
| 2009/0010643 | A1 | * | 1/2009 | DeLew et al. | 398/17 |
| 2009/0113045 | A1 | * | 4/2009 | Kozisek | 709/224 |

FOREIGN PATENT DOCUMENTS

| DE | 10 2007 006 614 A1 | 8/2008 |
|---|---|---|
| EP | 0 335 917 B1 | 10/1994 |

* cited by examiner

*Primary Examiner* — Chi Pham
*Assistant Examiner* — Soon-Dong D Hyun
(74) *Attorney, Agent, or Firm* — Lempia Summerfield Katz LLC

(57) ABSTRACT

A method for identifying possible error causes in a network having a plurality of computer-based nodes is provided. The method comprises proceeding from a control node, the execution of a test module in each case running locally on all or on selected nodes that are to be tested is triggered for the purpose of identifying possible error causes on the respective node; testing of a network connection between all or selected nodes that are to be tested for the purpose of identifying possible error causes; and recording of a result including one error cause, provided such a cause can be identified.

11 Claims, 2 Drawing Sheets

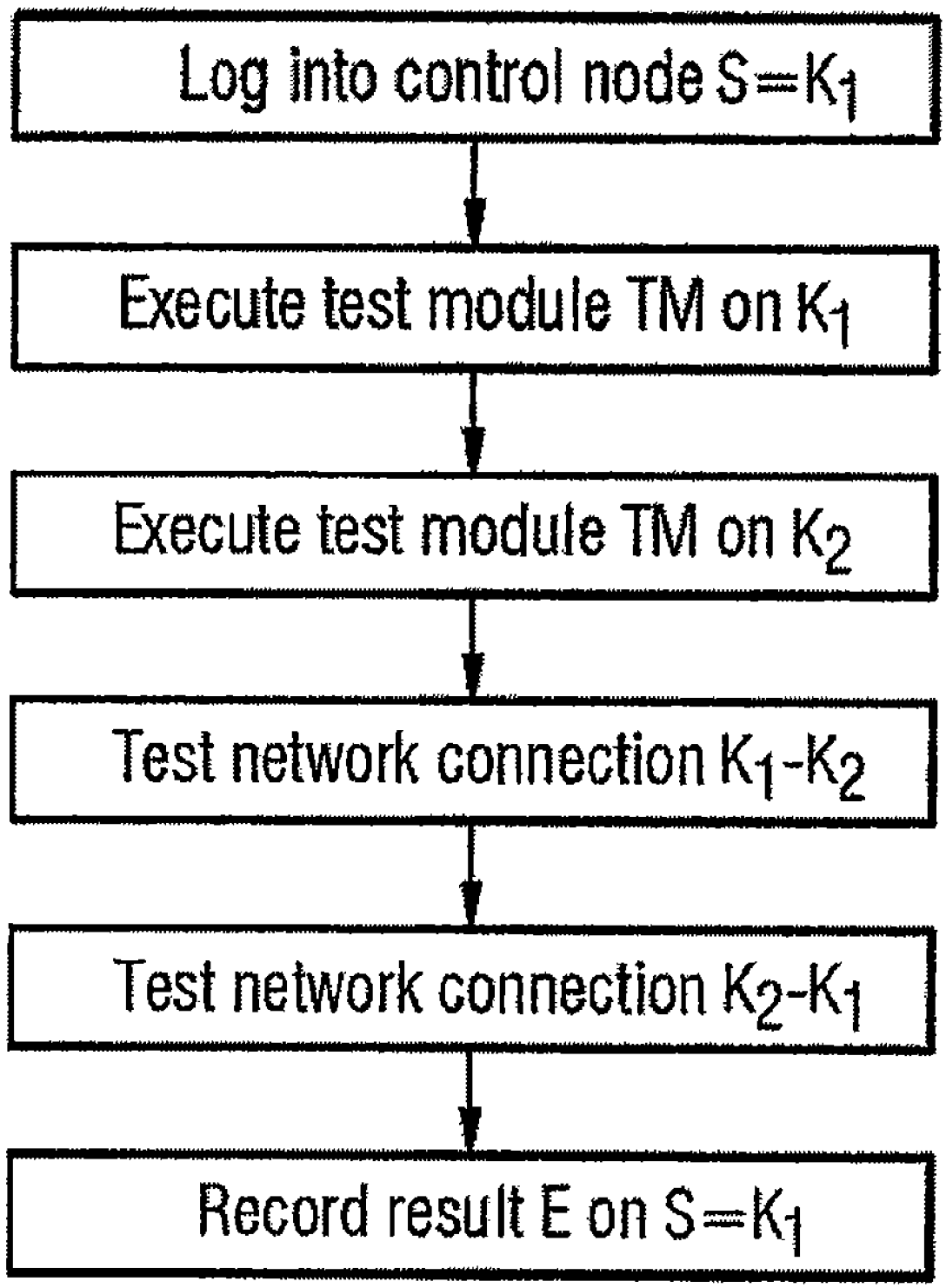

ERROR IDENTIFICATION IN A COMPUTER-BASED NETWORK

The present patent document claims the benefit of the filing date of DE 10 2007 054 648.5 filed on Nov. 15, 2007, which is hereby incorporated by reference.

BACKGROUND

The present embodiments relate to data processing and medical engineering. More specifically, the present embodiments relate to identifying possible causes of errors in a network having of a plurality of computer-based nodes, such as computer-based computed tomography (CT) systems, magnetic resonance imaging scanners, post-processing devices or other laboratory equipment.

In the medical engineering field, it is essential that an error that is identified within the network can be rectified as quickly as possible. Accordingly, it is a prerequisite to pinpoint the error as quickly as possible and with as much detail as possible.

There is a multiplicity of approaches for locating errors in a distributed computer-based system.

U.S. Pat. No. 5,732,213 discloses a system and a method for testing specific levels (layers) of an interface (Open Systems Interconnection, OSI) in a telecommunications network. The testing is based on using a data transmission protocol simulator. An emulator is used in order to emulate a remote node in the network with regard to an application layer (of the ISO-OSI layer model). Modules of a network node that are to be tested are in this case simulated or emulated on another test network node.

U.S. Pat. No. 5,937,165 discloses a system, a method and a computer program product for testing network systems with regard to their performance. In a first act an expected applications traffic load on the network is determined. Using that as a basis, a test scenario is run which is based on the expected network loads. The test scenario takes into account current operating system conditions and different network protocols such as TCP/IP or APPC.

U.S. Pat. No. 5,732,213 and U.S. Pat. No. 5,937,165 relate to the testing of the network and do not perform a more detailed testing of the network nodes involved. In addition, a manual interaction takes place at both endpoints of a network connection. A network administrator must log in both at the source node of the network connection that is to be tested and at the destination node of said connection in order to trigger or initiate the execution of specific network tests.

As soon as a communication problem has been identified within a network, the test programs focus on the network problems and check in particular the proper operation of the network connections (using ICMP PING or other specific protocols, for example). The checking of the functionality of the nodes involved receives too little attention.

SUMMARY AND DESCRIPTION

The present embodiments may obviate one or more of the problems or drawbacks inherent in the related art. For example, in one embodiment, error sources of the network nodes are taken into account and output, which entails a significantly smaller administration overhead. Accordingly, a more comprehensive test result, which also takes into account the network nodes, is possible in a simpler way.

In one embodiment a method for identifying possible error causes in a network having a plurality of computer-based nodes is provided. The method comprises proceeding from a control node, the execution of a test module in each case running locally on all or on selected nodes that are to be tested is triggered for the purpose of identifying possible error causes on the respective node; testing of a network connection between all or selected nodes that are to be tested for the purpose of identifying possible error causes; and recording of a result including one error cause, provided such a cause can be identified.

The achievement of the inventive object is described below with reference to the method. Advantages, features or alternative embodiments mentioned herein can also be applied correspondingly to the other achievements of the object (i.e. to the other categories of the claims such as a device or product) and vice versa. The corresponding functional features are achieved by corresponding objective features which are embodied in hardware.

In one embodiment, a method for identifying possible error sources or error causes in a network having a plurality of computer-based nodes is provided. The method includes the execution of a test module in each case running locally on all or on selected nodes that are to be tested for the purpose of identifying a possible error cause on the nodes to be tested is triggered on a computer-based control node; testing of a network connection between all or selected nodes of the network, in particular testing of a network connection between the node that is to be tested and the control node; and recording of a test result including at least one error cause, provided such a cause can be identified.

The "identifying" of possible error sources includes the localizing of the same in the network so that a computer-based node or a pointer unequivocally identifying the latter is always output as the result of the method.

The terms "error cause" or "error source", which are used synonymously in this context, include all categories of errors that can occur on all layers of the International Organization for Standardization-Open Systems Interconnection (ISO-OSI) layer model. The errors may include network problems and also such problems that are linked to the software or hardware of the respective node, such as, for example, a CPU overload, overflow in the memory area, or incorrect interfaces. Problems and/or possible error causes relating thereto are typically detected or identified by a NOMINAL/ACTUAL value comparison. Threshold values for the comparison, such as the NOMINAL value, can be configured therein. For example, a storage problem can be detected if the free storage space on the system disk is below a value of 5% of the total volume.

The nodes are processor- or computer-based nodes (possibly of heterogeneous type) in a network. The nodes can be computers for post-processing image data, scanners, medical installations or other digital equipment. The nodes include a control node, which is characterized in that it is the point from which the test method is controlled. The test result is also displayed and/or stored on the control node. In an alternative embodiment it is possible for the test method to be triggered from a first control computer, while the analysis is performed by a second control computer, so that the test result is displayed and presented on the second control computer, which is different from the first control computer. However, the first and second control computers may be identical.

The nodes within the network used as the control node can differ from test to test. The control node is dynamically variable and can be chosen or determined according to the administrator's circumstances or on the basis of other administrative requirements.

A test module may be executed locally on all the nodes that are to be tested. The test module is triggered by one and the same control node. In alternative embodiments, rather than using one and the same test module, node-specific test modules are used which are geared to the particular requirements of the respective node and so can run a specific test. No specific requirements are imposed with regard to the selection of the respective test module, apart from the requirement that all the test modules must be accessible via a defined web interface. Conventional test modules may be used, to which the interface is retrofitted.

The testing of the network connection is usually carried out between two nodes, between a source node, which sends a test message, and a destination node, which receives the test message. Testing includes a bandwidth test and further network-specific variables. The network connection is usually tested in both directions, for example, proceeding from the source node in the direction of the destination node and vice versa, such as both in a download direction and in an upload direction. Only one direction may be tested if necessary.

The test result includes one or more possible error causes, provided error causes are identified. of the test result may be a list, with entries relating to the tested nodes and a pointer to whether or not the test carried out has identified an error source.

In one embodiment, the test modules are executed in parallel in each case on the nodes to be tested. This produces a time saving and leads to the result of the error identification or troubleshooting method being available more quickly.

The nodes that are to be tested may be tested in a first phase and the respective network connections may be tested in a second phase. The time periods may be dimensioned such that the first phase and the second phase have no area of overlap. The testing of the nodes does not take place in the time period in which the network connections are tested. The result of the execution of the test modules cannot be distorted due to the fact that the network connections are subject to differences in load because of the test. The testing of the nodes can be carried out independently of the testing of the network connections. The testing on the individual nodes can also take place independently of one another in each case or asynchronously with respect to one another in each case.

A different order of method-related acts (e.g. test first node, test network connection(s) relating to the first node, test second node and then test the network connection(s) relating to the second node) is possible. Moreover, the aforementioned method-related acts can also be carried out in an interleaved or intermeshed manner (e.g., with an area of time overlap).

The result may include a list of possible error sources, with each error source being assigned an entry. The test result can subsequently be subjected to a further analysis. In this case the different entries are weighted according to predefinable empirical values. In the case of client/server networks, for example, if both a client and the network are cited as possible error sources of the problem, in most instances the problem lies with the client. If a server and the network have been identified as possible potential error sources, in all probability the server will be the cause of the error. The following empirical rule apply: If both the server and the client have been identified as a potential error source, then the client is most probably the error cause. The empirical values are stored in the form of predefinable rules. These rules are taken into account in the weighting of the test result such that the most likely error cause in each case is first in the list and heads other possible error sources, in descending order of probability.

In order to pinpoint possible error sources, an administrator simply has to log in at a node in order to find an error in the network. It is no longer necessary for the administrator to log in separately each time at each of the nodes that are to be tested. For that purpose a separate interface is implemented between the test module at a first node and the test module at a second node. The interface can be embodied, for example, by way of a web service. The test of the respective test method can be implemented in a software or hardware module on the node, with the network nodes or, as the case may be, their test modules communicating directly with one another.

The respective test module that is implemented locally in each case on the nodes that are to be tested includes hardware and/or software modules.

In one embodiment, the nodes (including the control node) and/or the test modules of the respective node interact via a separate interface, such as a web service.

In one embodiment, a system for identifying possible error causes in a network having a plurality of computer-based nodes comprises a control node which is embodied for the purpose of triggering the execution of a test module, the respective test module being implemented and running locally on at least one of the nodes that are to be tested and serving to identify possible error causes on the node; a connection tester which is designed to test a network connection between all or selected nodes for the purpose of identifying possible error causes in the network; and a result module which is designed to record and present (e.g. display) a test result. The test result includes at least one error cause if such a cause can be identified.

The nodes and the control node are interconnected in a network. The test modules implemented on the respective node can interact with one another via a separate interface (e.g. via a web service). The respective test modules test the respective nodes in order to identify possible error causes on the node. The network tester (connection tester) tests the respective network connection and provides possible error causes that can occur in relation to the network connection. In order to test the network, a point-to-point connection is set up sequentially or in parallel between the control node and the nodes that are to be tested.

The result module serves for deriving a result which indicates possible error sources on the node and possible error sources in the network in combination.

In one embodiment, a test module is used in a system having the features that have been described above.

The above-described embodiments of the method can also be embodied as a computer program product, wherein the computer is prompted to perform the above-described method and the program code is executed by a processor.

In one embodiment, a storage medium that can be read by a computer is provided. The storage medium stores the above-described computer-implemented method.

Individual components of the above-described method may be implemented in one commercially marketable entity and the remaining components in another commercially marketable entity, such as a distributed system.

BRIEF DESCRIPTION OF DRAWINGS

FIG. 3 shows a variant to the embodiment shown in FIG. 2.

DETAILED DESCRIPTION

Figure 1:
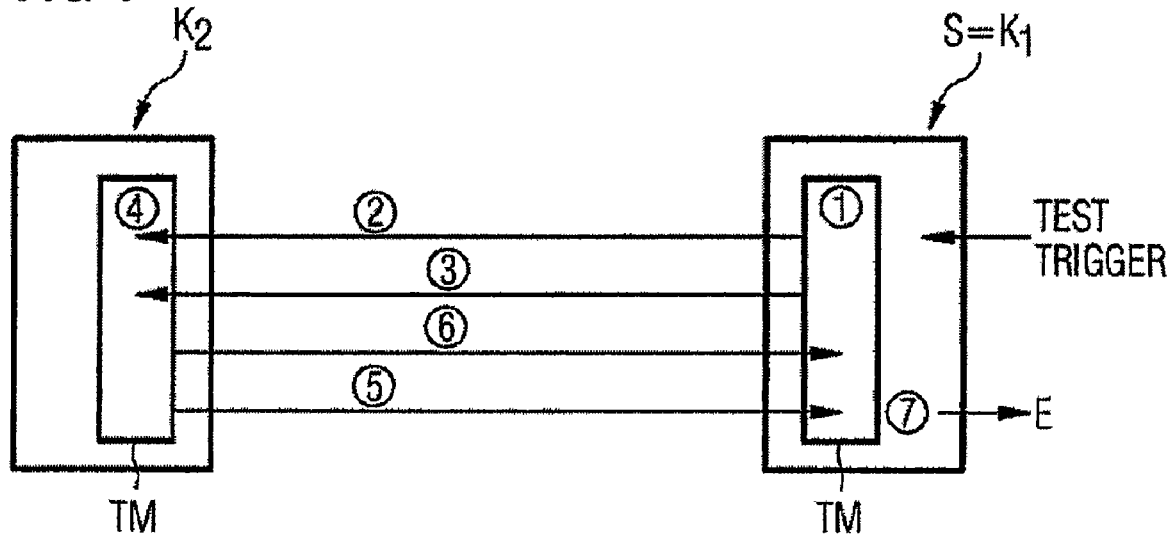
FIG. 1 shows a system with two exemplary nodes of a network.

FIG. 1 shows two nodes $K_1$ and $K_2$ of a medical network NW that are to be tested. The network NW may include a plurality of nodes K. As used herein, "K" is the superset of all nodes, while the subscripts are directed to the individual nodes. An error source in the network NW may be pinpointed or identified and localized. A test is triggered at the node $K_1$, as indicated in FIG. 1 by the inward-pointing arrow on the right-hand side in the node $K_1$. The execution of a local test module TM on the node $K_1$ is triggered at the time indicated by "1" in a circle in FIG. 1. The test module TM checks the hardware and software modules of the node $K_1$. The arrow 2, which points from node $K_1$ to node $K_2$, denotes a testing of a network connection, the network connection originating from the node $K_1$ and being directed to the node $K_2$. The arrow 3, which points from the node $K_1$ to the node $K_2$, indicates a request for a server test on node $K_2$. The circle 4 in the node $K_2$ indicates that the test module TM is executed on the node $K_2$ at this time. The test module is executed locally on the node $K_2$ and checks the hardware and software of the node $K_2$. A network test can then take place at the time 5 (or the arrow 5 originating from $K_2$ and pointing to $K_1$). The network test is carried out for the direction of the data transmission: $K_2 \rightarrow K_1$. Next, at the time 6 (with the arrow 6), the results of the test module TM that has been executed on the node $K_2$ can be transferred to the node $K_1$. A result E of the tests is evaluated at the time 7.

The numerals contained in the circles do not represent reference signs, but indicate different times or time phases at which specific method-related acts are executed. The usual sequence is: 1, 2, 3, 4, 5, 6, and 7. However, alternative time sequences and/or time overlaps are also conceivable.

In the example shown in FIG. 1, the node $K_1$ serves as the control node S from which a test is triggered or initiated and on which in addition the result E is recorded, evaluated and/or displayed. The control node S is therefore active and controls the execution of the respective test modules TM, which are to be executed locally on the further nodes K that are to be tested, while the further nodes K remain passive. The administrator only has to log in on the node $K_1$, which serves as the control node S, and does not have to obtain any further access to the node $K_2$. The test modules TM each implemented locally on the node K communicate with one another via a web service.

FIG. 2 again schematically illustrates a possible flow sequence according to one embodiment of a method. In a first act, the administrator logs into a node K as the control computer S. In a second act, a test module TM is executed on the control computer S. A network connection is then tested for the direction $K_1 \rightarrow K_2$. A server test on the node $K_2$ is requested, the test is then carried out and the hardware and/or software modules on the node $K_2$ are checked. The network connection is checked in the other direction: $K_2 \rightarrow K_1$ and the results of the test module TM, which has been executed on the node $K_2$, can be transferred to the node $K_1$ or the control node S. A result E can then be recorded, evaluated and displayed on the control node S.

An alternative flow sequence to that described in connection with the one in FIG. 2 (and described indirectly in FIG. 1) is shown in FIG. 3. As shown in FIG. 3, all nodes are tested in a first node test phase and all relevant network connections (preferably those relating to the nodes to be tested) are tested in a second network connection test phase. The time sequence represented by the numerals in the circles in FIG. 1 would then be adapted accordingly. Other time sequences may be used.

It is also possible to make a preselection of nodes K that are to be tested so that the test module TM is executed only on relevant nodes K, for example, on such nodes that potentially are linked with an identified error. If, for example, there are nodes K, which definitely cannot be the cause of the identified error, these nodes K do not necessarily have to be tested.

Figure 2:
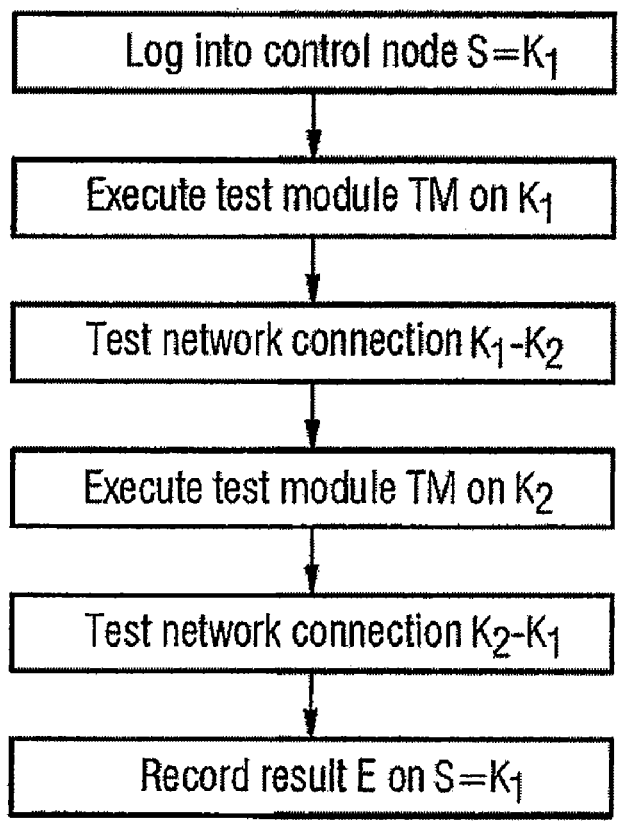
FIG. 2 shows a flowchart of one embodiment of a method for identifying possible error causes in a network.

The expression "Execute a test module TM" used in FIGS. 2 and 3 includes a time period between the starting of the respective test module and the derivation and/or recording or the presence of results relating to the test. As long as no results E are yet available, there is also a wait for the test module execution. The waiting time can be used by the initiation of parallel tests (of other nodes K and/or other network connections).

The network protocol may be the TCP/IP protocol. However, the network protocol is not fixed to a specific type.

The network can be a local area network (LAN) or a wide area network (WAN).

The administrator must only log into the control node S for troubleshooting purposes and not into the nodes (e.g., $K_2$) that are to be tested.

In addition to a network-based search for possible error sources, a node-based search for possible error sources is also carried out on the nodes K. The node-based search for error sources includes a testing of all or selected software or hardware modules of the respective node. In this case predefinable hardware or software parameters are checked, such as, for example, utilization of CPU capacity, or memory usage. As soon as the checked parameters lie outside a permitted range, the respective node is flagged as a possible error cause. The connection tester provides a bidirectional testing of the respective communication connection between a first node $K_1$ and a second node $K_2$. A bandwidth test, a latency test, a throughput test, and a PING test may be performed here. As soon as predefinable network parameters lie outside a permitted range, the network is flagged as a possible error cause. All possible error causes are collated in the result E.

The control computer S may receive and evaluate all the test results (of the respective test modules TM) of all the nodes K that are to be tested. Following the evaluation, usually at least one possible error source is derived and displayed. If such an error source is not unequivocally identifiable (for example because a plurality of objects have been flagged as possible error sources), a list including a plurality of potential error sources is output as the result E.

In one embodiment, the result E can be analyzed even further by a weighting of the respective entries being carried out. The weighting of the respective entries being carried out may be based on predefinable empirical values. In one embodiment, first the possible error sources that occurred in connection with a first node K or with the control node S are listed, followed by possible error sources that occurred in connection with a second node $K_2$, and further followed by possible error sources that were recorded in connection with the network NW.

If the network is a client/server network, then the aforementioned empirical values can be formulated in the form of the following rules: "Possible error sources detected in the client and in the network"→most likely error cause: "Client", "Possible error sources detected in server and network"→most likely error cause: "Server", and "Possible error sources detected in server and client"→most likely error source: "Client".

The rules can be modified dynamically at any time and so adapted to the conditions currently being experienced.

In the example shown in FIG. 1, the first node $K_1$ serves as the control node S from which the testing is initiated with the aid of the test modules TM. It is, however, possible at any time to choose a different node as the control node S.

The description and the exemplary embodiments are categorically not to be understood as limiting with regard to a specific physical realization of the invention. For a person skilled in the relevant art it is obvious in particular that the invention can be implemented either in part or in its entirety in software and/or hardware and/or in a form distributed over a plurality of physical products—in this case in particular also including computer program products.

The invention claimed is:

1. A method for identifying possible error causes in a network having a plurality of computer-based medical imaging nodes, the method comprising:
   executing a first test module, the first test module running locally on a control node, the execution of the first test module being used to identify possible error causes on the control node;
   using the control node to trigger the execution of a second test module, the second test module running locally on one computer-based medical imaging node of the plurality that is to be tested, the execution of the second test module being used to identify possible medical imaging node error causes on the one computer-based medical imaging node;
   testing of a network connection between the control node and the one computer-based medical imaging node that is to be tested to identify possible network error causes; and
   recording of a result that includes an error cause at the control node when the error cause is identified,
   wherein the first test module, which runs locally on the control node, checks a hardware module or a software module of the control node,
   wherein the second test module, which runs locally on the one computer-based medical imaging node, checks a hardware module or a software module of the one computer-based medical imaging node that is to be tested, and
   wherein the control node is selectable from the plurality of computer-based medical imaging nodes.

2. The method as claimed in claim 1, wherein testing of the network connection includes testing between two computer-based medical imaging nodes of the plurality in a download direction and an upload direction.

3. The method as claimed in claim 1, further comprising:
   using the control node to execute a third test module, the third test module running locally on another computer-based medical imaging node of the plurality that is to be tested, the execution of the third test module being used to identify possible medical imaging node error causes on the other computer-based medical imaging node; and
   executing the second test module on the one computer-based medical imaging node and the third test module on the other computer-based medical imaging node in parallel.

4. The method as claimed claim 1, further comprising executing each of the first test module and the second test module in a time period that is not a time period in which the network connection is tested.

5. The method as claimed in claim 1, wherein the result includes entries relating to the execution of the first test module and the execution of the second test module, the entries in the result being analyzed and weighted on the basis of predefinable rules.

6. The method as claimed in claim 1, wherein execution of the second test module includes triggering the execution of the second test module on the one computer-based medical imaging node exclusively proceeding from the control node, so that only an access to the control node is necessary in order to execute the second test module on the one computer-based medical imaging node.

7. The method as claimed in claim 1, wherein the control node, the first test module, or the control node and the first test module interact via a web service interface.

8. The method as claimed in claim 1, wherein testing of the network connection comprises testing the bandwidth of the network connection.

9. The method as claimed in claim 1, wherein the control node is operable to evaluate results of the first test module, the second test module, and the network test.

10. A system for identifying possible error causes in a network having a plurality of computer-based nodes, the system comprising:
    a control node that triggers the execution of a first test module and a second test module, the first test module being implemented and running locally on the control node to identify possible error causes on the control node, the second test module being implemented and running locally on a computer-based node of the plurality to be tested to identify possible computer-based node error causes on the computer-based node to be tested;
    a connection tester that tests a network connection between all or selected computer-based nodes of the plurality to identify network error causes; and
    a result module that records and displays a result, the result including at least one error cause, provided the at least one error cause is identified,
    wherein the first test module checks a hardware module or a software module of the control node,
    wherein the second test module checks a hardware module or a software module of the computer-based node to be tested, and
    wherein the control node is selectable from the plurality of computer-based nodes.

11. A memory storage device including a computer program product having program code that is executable by a control node for:
    executing a first test module, the first test module running locally on the control node, the execution of the first test module being used to identify possible error causes on the control node;
    using the control node to trigger the execution of a second test module, the second test module running locally on one computer-based node of a plurality of computer-based nodes, the execution of the second test module being used to identify possible computer-based node error causes on the one computer-based node, wherein the one computer-based node is to be tested;
    testing of a network connection between the control node and the one computer-based node that is to be tested to identify possible network error causes; and
    recording of a result that includes an error cause when the error cause is identified,
    wherein the first test module, which runs locally on the control node, checks a hardware module or a software module of the control node,
    wherein the second test module checks a hardware module or a software module of the one computer-based node that is to be tested, and
    wherein the control node is selectable from the plurality of computer-based nodes.

* * * * *